United States Patent [19]

Sutter, Jr.

[11] Patent Number: 5,767,477
[45] Date of Patent: Jun. 16, 1998

[54] LASER MARKING APPARATUS FOR MARKING TWIN-LINE MESSAGES

[75] Inventor: Leroy V. Sutter, Jr., Irvine, Calif.

[73] Assignee: Domino Printing Sciences Plc, Cambridge, United Kingdom

[21] Appl. No.: 683,566

[22] Filed: Jul. 17, 1996

Related U.S. Application Data

[63] Continuation of Ser. No. 217,325, Mar. 23, 1994, abandoned.

[51] Int. Cl.⁶ .................................................. B23K 26/08
[52] U.S. Cl. ........................... 219/121.8; 219/121.76; 347/255
[58] Field of Search .................... 219/121.78, 121.79, 219/121.8, 121.81, 121.76, 121.77; 347/255, 256, 257, 258

[56] References Cited

U.S. PATENT DOCUMENTS

| | | | |
|---|---|---|---|
| 4,328,410 | 5/1982 | Slivinsky et al. | 219/121.8 |
| 4,482,902 | 11/1984 | Bailey et al. | 347/255 |
| 4,564,739 | 1/1986 | Mattelin | 219/121.77 |
| 4,652,722 | 3/1987 | Stone et al. | 219/121.76 |
| 4,712,117 | 12/1987 | Kawagnchi et al. | 347/257 |
| 4,739,162 | 4/1988 | Oritz, Jr. et al. | 219/121.8 |
| 4,820,899 | 4/1989 | Hikima et al. | 219/121.76 |
| 4,825,036 | 4/1989 | Bickel et al. | 219/121.78 |
| 4,944,817 | 7/1990 | Bourell et al. | 219/121.8 |
| 4,956,539 | 9/1990 | Uesugi et al. | 219/121.8 |
| 5,198,843 | 3/1993 | Ito et al. | 347/256 |
| 5,229,573 | 7/1993 | Stone et al. | 219/121.76 |
| 5,229,574 | 7/1993 | Stone | 219/121.76 |
| 5,231,264 | 7/1993 | Fujita | 219/121.78 |
| 5,302,802 | 4/1994 | Fujinaga et al. | 219/121.78 |

FOREIGN PATENT DOCUMENTS

| | | | |
|---|---|---|---|
| 60-106686 | 6/1985 | Japan | 219/121.8 |
| 60-184488 | 9/1985 | Japan | 219/121.8 |
| 63-84786 | 4/1988 | Japan | 219/121.75 |
| 3-47685 | 2/1991 | Japan | 219/121.75 |

*Primary Examiner*—Geoffrey S. Evans
*Attorney, Agent, or Firm*—Lyon & Lyon LLP

[57] ABSTRACT

A galvanometer optics assembly includes a housing which has a laser beam input which is optically coupled to the laser beam output of the laser marking apparatus, a first laser beam output and a second laser beam output, a stationary mirror which is fixedly coupled to the housing and is optically coupled to the laser beam input of the housing, a galvanometer mirror which is rotatively coupled to the housing and is optically coupled to the stationary mirror, a galvanometer optics motor which has a shaft which is fixedly coupled to the galvanometer mirror so that the galvanometer mirror may be optically coupled to either the first laser beam output or the second laser beam output and a galvanometer controller which is electrically coupled to the galvanometer optics motor. The galvanometer optics assembly is for use with a laser marking apparatus which includes a housing and and a laser beam output which is optically coupled to the lasers. Each of a plurality of individual lasers in the housing is dedicated to write a predetermined character row.

5 Claims, 2 Drawing Sheets

LASER MARKING APPARATUS FOR MARKING TWIN-LINE MESSAGES

This is a continuation of application Ser. No. 08/217,325, filed on Mar. 23, 1996 now abandoned and which designated the U.S.

BACKGROUND OF THE INVENTION

The field of the invention is laser marking apparati for marking twin-line messages.

U.S. Pat. No. 4,652,722 teaches a laser marking apparatus which inscribes characters or other symbols onto moving articles or substrate. The symbols or characters are defined by a matrix having a predetermined number of rows and columns. The laser marking apparatus includes a plurality of individual lasers, each dedicated to write a predetermined character row. Columns are written in sequence as the article passes the laser head. Light energy from the lasers is directed by mirrors to an exit lens which focuses the laser beams onto the articles or substrate to be marked. Separate laser mirrors provide reduction in laser beam spacing thereby facilitating a correspondingly foreshortened laser beam path. The lasers are arranged into two groups and interleaved to form the desired character row spacing without mirror overlap or shadowing.

U.S. Pat. No. 4,636,043 teaches a laser beam scanning device which includes an optical system that is mounted on a carriage which is movable back and forth along a linear path in front of a target area and which is parallel to the optical path of a projected laser beam. The lens system includes a component on the carriage which is arranged in the optical path for the laser beam and serves to project the laser beam along a second optical path toward the target area and which is normal to the first optical path. The optical system also includes a focusing lens on the carriage which is arranged in the second optical path for focusing the laser beam on the target area. A pair of lenses that are mounted on the carriage as part of the optical system are arranged to form a collimating telescope so as to expand and then collimate the laser beam light for delivery to the focusing lens. The collimating lens of the pair is movable relative to the carriage along a path which is normal to the optical path so as to thereby shift the focal point in the target area. The device utilizes stepping motors for moving the carriage and collimating lens. The laser beam scanning device is a component of a laser marking apparatus system where the laser marking apparatus and the laser beam scanning device are controlled by a computerized control system.

U.S. Pat. No. 5,001,325 teaches a method of providing score lines in packaging material by local evaporation using a laser beam. The laser beam and the packaging material are movable relative to each other. The score lines are provided in a recurring pattern on at least one side of a web of packaging material as it advances at a uniform, adjustable speed. The intensity of the laser beam is adjustable, and the laser beam is moved in two mutually perpendicular directions under the control of pattern-dependent signals.

U.S. Pat. No. 4,564,739 discloses a method and apparatus for marking a fixed substrate which employs movable mirrors and a laser light defining optical system.

SUMMARY OF INVENTION

The present invention is directed to a laser marking apparatus for marking messages.

In a first aspect of the invention the laser marking apparatus is combined with a galvanometer optics assembly and a galvanometer controller in order to mark twin-line messages.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Figure 1:
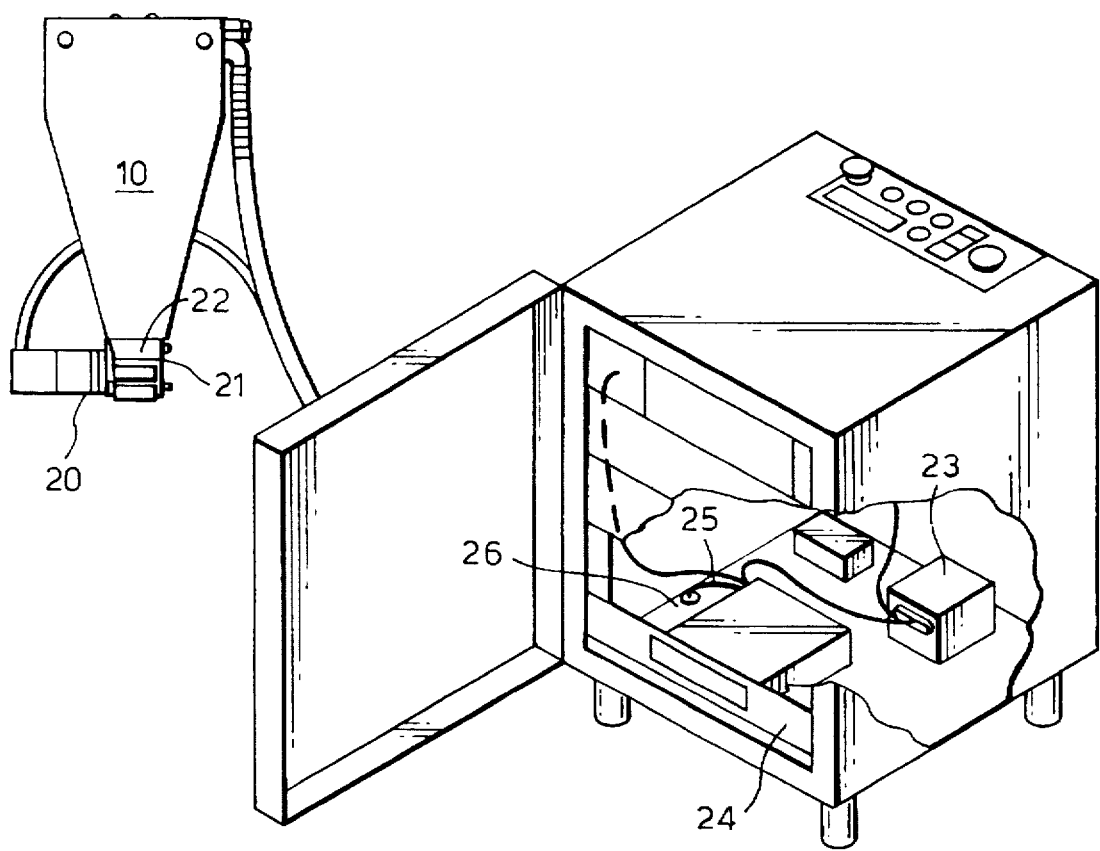
FIG. 1 is a schematic diagram of a laser marking apparatus for marking twin-line messages including a laser marking apparatus according to U.S. Pat. No. 4,652,722, a galvanometer controller and a galvanometer optics assembly according to the present invention.

Referring to FIG. 1 a laser marking apparatus 10 includes a housing 11 in which a plurality of individual lasers, each of which is dedicated to write a predetermined character row, are disposed and a laser beam output 12 which is optically coupled to the lasers. U.S. Pat. No. 4,652,722 teaches the laser marking apparatus 10. The laser marking apparatus 10 also includes a galvanometer optics assembly 20 with a lens set 21 and a lens shroud 22, a DC power supply 23, a galvanometer controller 24, interface cable 25 and a user interface board. The galvanometer optics assembly 20 is for use with the laser marking apparatus 10 in order to mark twin-line messages. The DC power supply 23 provides three voltage levels to the galvanometer controller 24 and the galvanometer optics assembly 20. The galvanometer controller 24 is tuned to the galvanometer optics assembly 20 and receives commands via the interface cable 25 to the user interface board 26. When operating correctly the galvanometer optics assembly 20 directs the laser beams from the laser marking apparatus to one of two possible position via software commands programmed into the message command string. The message command string programmed into the laser marking apparatus 10 determines the order and position of the laser markings.

The galvanometer optics assembly 20 directs the laser beams from the laser marking apparatus 10 to one of two positions, "A" and "B", respectively. The laser beams are angled at either a plus 26 degrees or a minus 26 degrees from the perpendicular when the laser beams are in either the "A" position or the "B" position, respectively. The separation, "L", of the two marking positions depends on the lens set 21 which is used. With the standard 2.75 inch focal length lens set, the two positions are separated by 1.8 inches. With the macro-lens 2.00 inch focal length lens set, the two positions are separated by 1.1 inches. The separation, "L", is the longest message that can be marked in the shorter of the two twin-line messages minus a factor for the fly-back time, approximately 10 milliseconds, of the galvanometer optics assembly 20. The longer marked line in the twin-line message can be up to 100 characters which is the message limit of the software. The shorter marked line in the twin-line message can be up to 1.8 inches in length minus the "fly-back distance" which equals the fly-back time multiplied by the velocity of the marking substrate. If the velocity is 100 feet per minute, the fly-back distance equals 0.20 inches.

Figure 2:
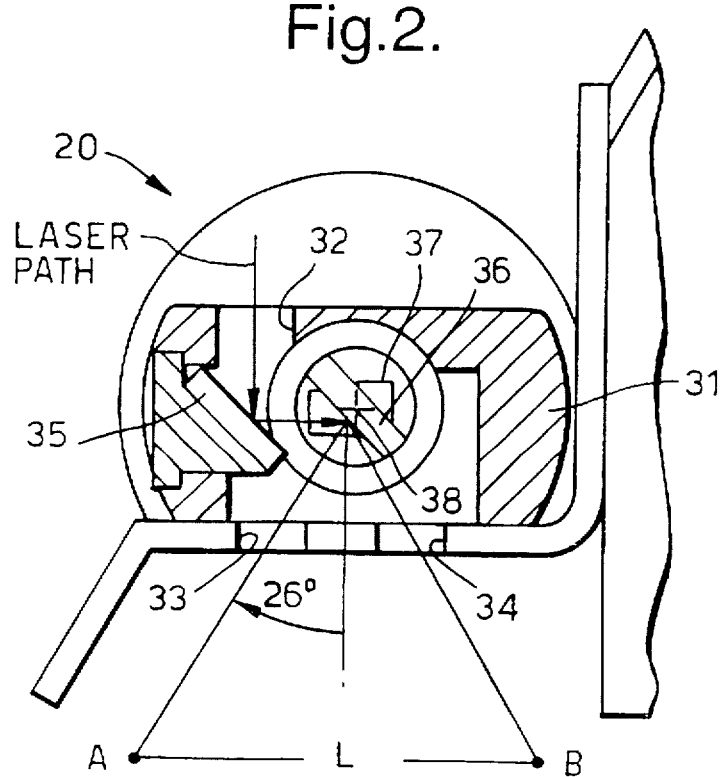
FIG. 2 is a schematic diagram of the laser path geometry of the galvanometer optics assembly of FIG. 1.
Figure 3:
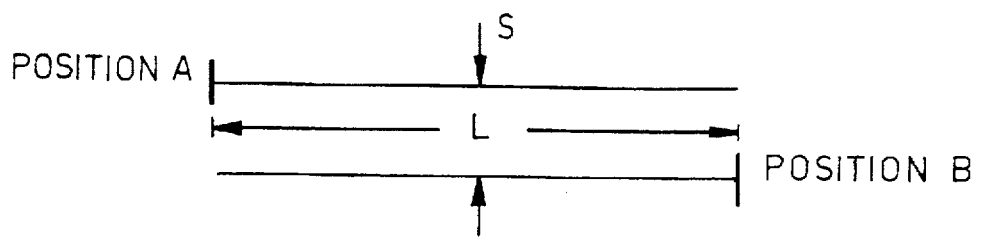
FIG. 3 is a schematic diagram of the marking geometry of the galvanometer optics assembly of FIG. 1.

Referring to FIG. 2 in conjunction with FIG. 3 the galvanometer optics assembly 20 includes a housing 31 with a laser beam input 32, a first laser beam output 33 and a second laser beam output 34, a stationary mirror 35, a galvanometer mirror 36 and a galvanometer optics motor 37 which has a shaft 38. The laser beam input 32 is optically coupled to the laser beam output 12 of the laser marking apparatus 10. The stationary mirror 35 is fixedly coupled to the housing 31 and is optically coupled to the laser beam input 32 of the housing 31. The galvanometer mirror 36 is rotatively coupled to the housing 31 and is optically coupled to the stationary mirror 35. The shaft 38 of the galvanometer optics motor 37 is fixedly coupled to the galvanometer mirror 36 so that the galvanometer mirror 36 may be optically coupled to either the first laser beam output 33 or the second laser beam output 34. The galvanometer controller 24 controls the galvanometer optics motor 37.

Still referring to FIG. 2 in conjunction with FIG. 3 the laser beams from the laser marking apparatus 10 are reflected by the stationary mirror 35 onto the galvanometer mirror 36, which has been rotated to a first position, and is then directed onto position "A" where the first line of the message is printed. The galvanometer mirror 36 is then commanded to rotate to a second position so that the laser beams are then directed onto position "B" where the second line of the message is printed.

In order to separate the two lines of the twin-line mark from overlapping, the laser heads of the laser marking apparatus 10 must be rotated angle of less than 15 degrees on an axis perpendicular to the surface of the marking substrate so that the centers of the two marks are separated by a distance, "S", where S is approximately equal to the product "L(Theta)" and (Theta) is the rotation angle of the laser heads. For the standard lens set 21 with the laser head rotated 10 degrees (0.175 radian) the separation of the two lines is 0.31 inch. The rotation of the laser heads will slightly italicize the laser marking on both lines in the same direction. The height of the two lines with respect to each other can be adjusted by tilting the laser heads along the axis of motion of the marking substrate or by carefully adjusting the rotation angle of the galvanometer optics motor 37 in the galvanometer optics assembly 20.

From the foregoing it can be seen that a combination apparatus for applying labels to containers and laser cutter including a cutter drum and a laser system has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. For use with a laser marking apparatus including a housing in which a plurality of lasers are disposed and a laser beam output is optically coupled to the lasers, a galvanometer optics assembly comprising a housing having a laser beam input, a first laser beam output and a second laser beam output, said laser beam input being optically coupled to the laser beam output of the laser marking apparatus and said first and second laser output paths of said housing, a mirror attached to said housing and optically coupled to said laser beam input of said housing, a galvanometer mirror rotatably coupled to said housing and optically coupled to said mirror and said laser input path, and a galvanometer controller electrically coupled to said galvanometer mirror to enable the creation of twin rows of characters by rotating said galvanometer mirror between a first position where it is optically coupled to said first laser beam output of said housing and a second position where it is optically coupled to said second laser beam output of said housing.

2. The optics assembly of claim 1, further comprising a galvanometer optics motor having a shaft fixedly coupled to said galvanometer mirror, said galvanometer optics motor being electrically coupled to said galvanometer controller.

3. A method of marking a twin-line message comprising the steps of reflecting a plurality of laser beams off of a first mirror, directing the reflected plurality of laser beams toward a second mirror, rotating the second mirror to a first position, reflecting the plurality of laser beams off of the second mirror, directing the plurality of laser beams reflected off of the second mirror toward an article to be marked, marking a first line of characters on the article, rotating the second mirror to a second position, reflecting the plurality of laser beams off of the second mirror, directing the plurality of laser beams reflected off of the second mirror toward the article, and marking a second line of characters on the article parallel to the first line of characters.

4. For use with a laser marking apparatus including a housing in which a plurality of lasers are disposed and a laser beam output is optically coupled to the lasers, a galvanometer optics assembly comprising a housing having a laser beam input, a first laser beam output and a second laser beam output, said laser beam input being optically coupled to the laser beam output of the laser marking apparatus and said first and second laser beam outputs of said housing, a mirror attached to said housing and optically coupled to said laser beam input of said housing, a galvanometer mirror rotatably coupled to said housing and optically coupled to said mirror and said laser beam input, and a galvanometer controller electrically coupled to said galvanometer mirror to enable the creation of twin rows of characters, said galvanometer controller being adapted to rotate said galvanometer mirror between a first position where it is optically coupled to said first laser beam output of said housing and a second position where it is optically coupled to said second laser beam output of said housing, said mirror and said galvanometer mirror being adapted to deflect the laser beams from each of the plurality of lasers in a first direction and then in a second direction in a single plane while maintaining the orientation of an image defined by the plurality of lasers.

5. The optics assembly of claim 4, further comprising a galvanometer optics motor having a shaft fixedly coupled to said galvanometer mirror, said galvanometer optics motor being electrically coupled to said galvanometer optics motor to enable the creation of two rows of characters.

* * * * *